United States Patent [19]

Gilmore

[11] Patent Number: 4,870,743
[45] Date of Patent: Oct. 3, 1989

[54] QUICK CHANGE TOOL ASSEMBLY FOR ULTRASONIC MACHINE TOOL

[75] Inventor: James R. Gilmore, Ligonier, Pa.

[73] Assignee: Extrude Hone Corporation, Iwrin, Pa.

[21] Appl. No.: 107,309

[22] Filed: Oct. 13, 1987

[51] Int. Cl.[4] ............................................. B23K 27/00
[52] U.S. Cl. ..................................... 29/568; 156/580; 228/1.1; 51/59 SS; 279/1 TS
[58] Field of Search ....................... 29/568; 279/1 TS; 51/59 SS; 228/1.1; 156/580

[56] References Cited

U.S. PATENT DOCUMENTS

| Re. 28,642 | 12/1975 | Davis | 228/1.1 |
| 4,026,143 | 5/1977 | Holland | 82/21 B |
| 4,647,336 | 3/1987 | Coenen et al. | 228/1.1 |

FOREIGN PATENT DOCUMENTS 47-14869  2/1969  Japan .

Primary Examiner—Bruce Y. Arnold
Assistant Examiner—Jay Ryan

[57] ABSTRACT

A structure for quickly and accurately aligning an ultrasonic tool assembly on an ultrasonic machine tool table in which a mounting is provided on said table and an engaging device is secured to said tool assembly which can be made to quickly engage the mounting to accurately align the tool assembly.

2 Claims, 3 Drawing Sheets

QUICK CHANGE TOOL ASSEMBLY FOR ULTRASONIC MACHINE TOOL

This invention relates to a quick change tool assembly for ultrasonic machine tools. More specifically, this invention relates to a tool assembly for ultrasonic machine tools having automatic alignment features thereon that will greatly speed up the mounting of the assembly into the ultrasonic machine tool base frame, to thereby greatly shorten the time involved in changing to tool.

BACKGROUND OF THE INVENTION

Ultrasonic machining is a well known machining process whereby the surface of a workpiece is abraded by a grit contained in a slurry circulated between the workpiece surface and a vibrating tool adjacent thereto, vibrating at frequencies above the audible range, typically within the range of 19,500 to 20,500 cycles per second. The abrading tool face is usually provided with a three-dimensional form, while a negative compliment thereof is machined onto the workpiece surface. This process finds particular utility in its ability to work difficult materials, such as glass, ceramics, calcined or vitrified refractory materials and hard and/or brittle metals, which are not susceptible to machining by any other traditional technique, or even such nontraditional techniques such as electrical discharge machining, electro-chemical machining or the like.

The use of ultrasonic machining for production applications may also be limited by the time required to mount and or change the tool assembly and align the tool with the workpiece. Typical tool changing times run from 30 minutes to an hour. This is because the tool assembly itself, that is the transducer, booster, fixturing plate and tool, referred to in the art as a sonotrode, must be carefully aligned to assure very accurate alignment of the components and good tight unions, and once the assembly is properly assembled, it must be very carefully mounted and aligned on the machine tool table so it will mate accurately with the workpiece mounting and accordingly the workpiece. In many applications where the abrading time may run for very short times, say 2 to 5 minutes, the 30 minute to one hour tool change over time renders the use of ultrasonic machining as economically unjustified for such short run jobs.

SUMMARY AND OBJECTS OF THE INVENTION

This invention is predicated on the development of a structure to quickly and accurately mount and align an ultrasonic tool assembly onto a machine tool table. Utilization of this structure will serve to greatly reduce the tool change over time and thus render ultrasonic machining as a more viable machining method for short run jobs.

Accordingly, it is an object of this invention to provide a structure for quickly and accurately mounting an ultrasonic tool assembly onto a machine tool table.

Another object of this invention is to provide a tool assembly for ultrasonic machine tools and a machine tool table which in combination will permit the more rapid mounting and alignment of the ultrasonic tool assembly on the machine tool table while assuring an accurate alignment of the tool assembly with the workpiece.

DESCRIPTION OF THE INVENTION

Figure 1:
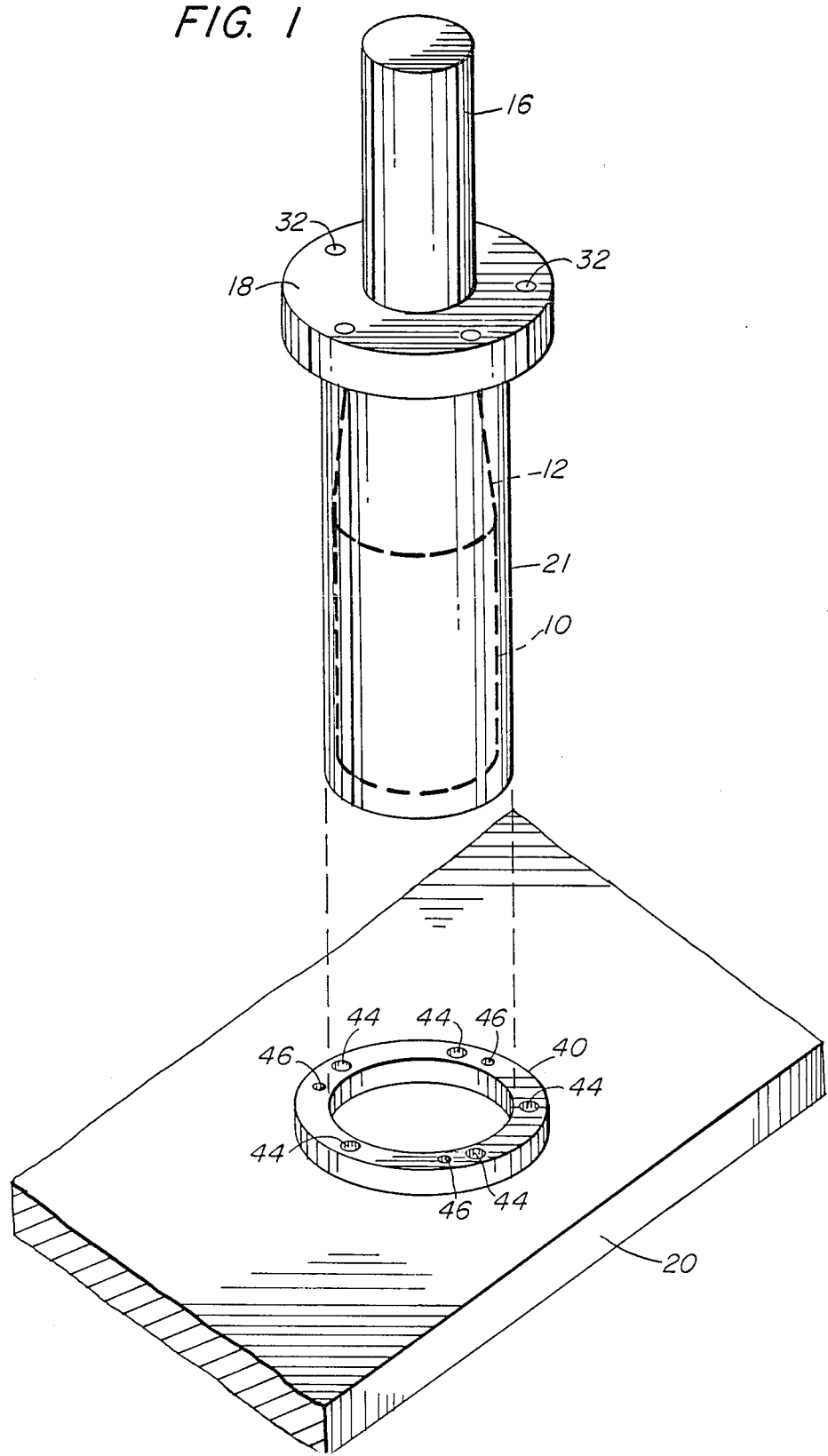
FIG. 1 is an isometric view of a typical ultrasonic tool assembly and machine tool table incorporating one embodiment of this invention for more rapidly and accurately mounting and aligning the tool assembly on the machine tool table.

Reference to the FIG. 1 will illustrate the arrangement of an ultrasonic tool assembly, which in essence consists of a transducer 10, having a booster 12 secured to the top thereof, and a tool, i.e. sonotrode 16 secured to the top of the booster 12. The transducer 10, which uses a stack of piezoelectric ceramic disks (not shown), is activated by a high frequency power source (not shown), which will induce a low amplitude, ultrasonic vibration in the stack of disks. The booster 12, having a conical configuration, serves to enhance or suppress the amplitude of the ultrasonic vibrations, so that the vibration amplitude at the small end of the cone can be controlled. Typically, in ultrasonic machine tools, the booster doubles the amplitude produced by the transducer. The sonotrode 16 has a solid body which transmits the ultrasonic vibrations from the end of the booster 12 to the working end of sonotrode 16. Since the vibrational motion must be transmitted from the transducer to the sonotrode, these three, components must be secured very tightly together. Because all three components are in ultrasonic vibration during operation, it would appear to be difficult if not impossible to secure the structure in a machine tool base. Fortunately, however, there are one or more node points, that is points where there is no vibration, along the alignment of the three components. Accordingly, an assembly support fixture, such as fixturing plate 18, is secured to the assembly at a node point which is utilized to secure the assembly to the machine tool's base structure, namely table 20. A water-tight jacket 21 is provided around transducer 10 which serves not only to maintain circulating cooling air around the transducer 10, but also protects transducer 10 from any grit or machining debris which will be washed down from the machining operation.

Figure 2:
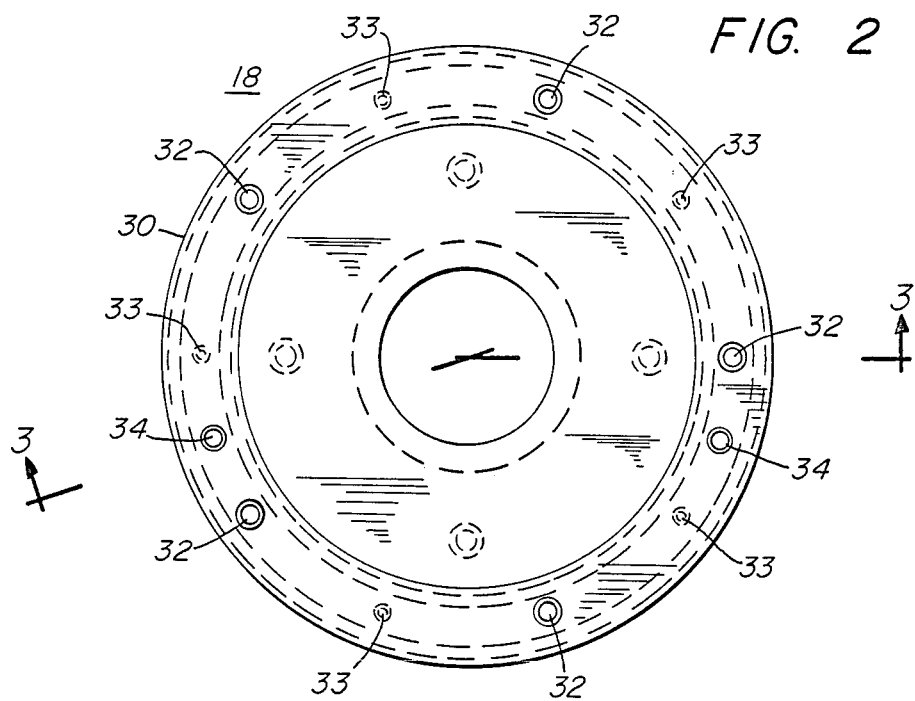
FIG. 2 is a top view of a fixture plate incorporating features thereon as necessary for the practice of one embodiment of this invention.
Figure 3:
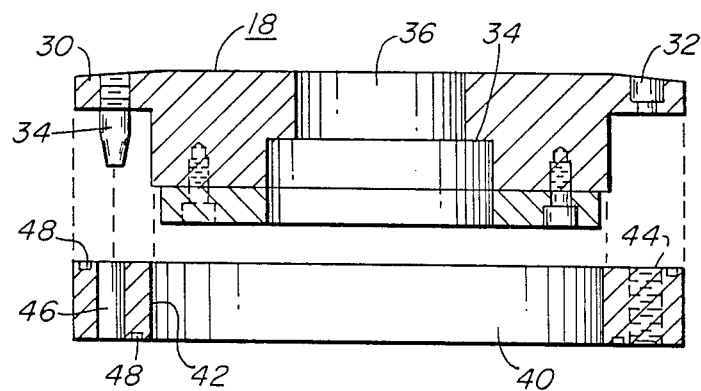
FIG. 3 is a side view of the fixture plate shown in FIG. 2 further illustrating its relationship with the retaining ring and master tooling plate.

Reference to FIGS. 2 and 3 will illustrate a fixturing plate 18 according to one embodiment of this invention which consists of a machined metal ring having a flange 30 encircling the upper periphery and having a plurality of holes 32 extending therethrough for joining the fixture plate 18 to master tooling ring 40. Holes 33 are equally spaced between holes 32 for the purpose of securing fixturing plate 18 to the machine tool table 20. In addition to holes 32, and 33, at least two other holes are provided through flange 30, each of which has a centering pin 34 tightly secured therein. A circular opening 36 is provided through the center of fixturing plate 18 which has a shoulder 38 therein so as to provide a circular opening having a different diameter on each side of fixturing plate 18.

Master tooling ring 40 has a circular opening 42 through the center thereof of such size that ring 40 will fit snugly around the smaller end of fixturing plate 18 and up to the bottom of flange 30. A plurality of tapped holes 44 mating with holes 32 through fixturing plate 18, must be provided through master tooling ring 40 for purposed of attaching fixturing plate 18 to master tooling ring 40. In addition, at least two smooth centering holes 46, mating with centering pins 34, must also be provided through master tooling ring 40. A pair of encircling grooves 48 may be provided around each flat surface of master tooling plate 40 for purposes of inserting o-ring seals (not shown) to seal the interior of the tool assembly from slurry. Retaining ring 48 is provided for the purpose of securing the transducer/booster assembly to fixture plate 18 such that the top of booster 12 will fit up into the underside of opening 42, while sonotrode 14 will fit down through the top of opening 42 against booster 12.

In application of the above described elements, master tooling plate 40 should be attached to and become a permanent part of machine tool table 20. Before it is permanently attached, it must of course be properly aligned. Subsequently, whenever a tool assembly is attached to the table 20, all that must be done is that centering pins 34 should be inserted into centering holes 46, and then fixturing plate 18 bolted to master tooling ring 40 through holes 32 and 44. Since master tooling ring 40 has already been properly aligned on table 20 the centering pins 34 inserted into centering holes 46 will assure that the tool assembly is also properly aligned. Accordingly, it is important that centering pin 34 fit rather snugly into centering holes 46 so that there is no play in the fit which could lead to misalignment. Accordingly, it is preferred that centering holes 46 have a hard alloy sleeved lining (not shown) which will better withstand repeated insertion of the centering pins 34. To facilitate inserting centering pins 34 in to the tight fitting centering holes 46, it is most helpful if the ends of the centering pins 34 are somewhat tapered and rounded so that initial insertion can be facilitated. To remove the tool assembly from the machine tool table 20, all that need be done is to remove the bolts holding fixture plate 18 to master tooling ring 40 at holes 32 and 44, and then lift straight up on the tool assembly.

Figure 4:
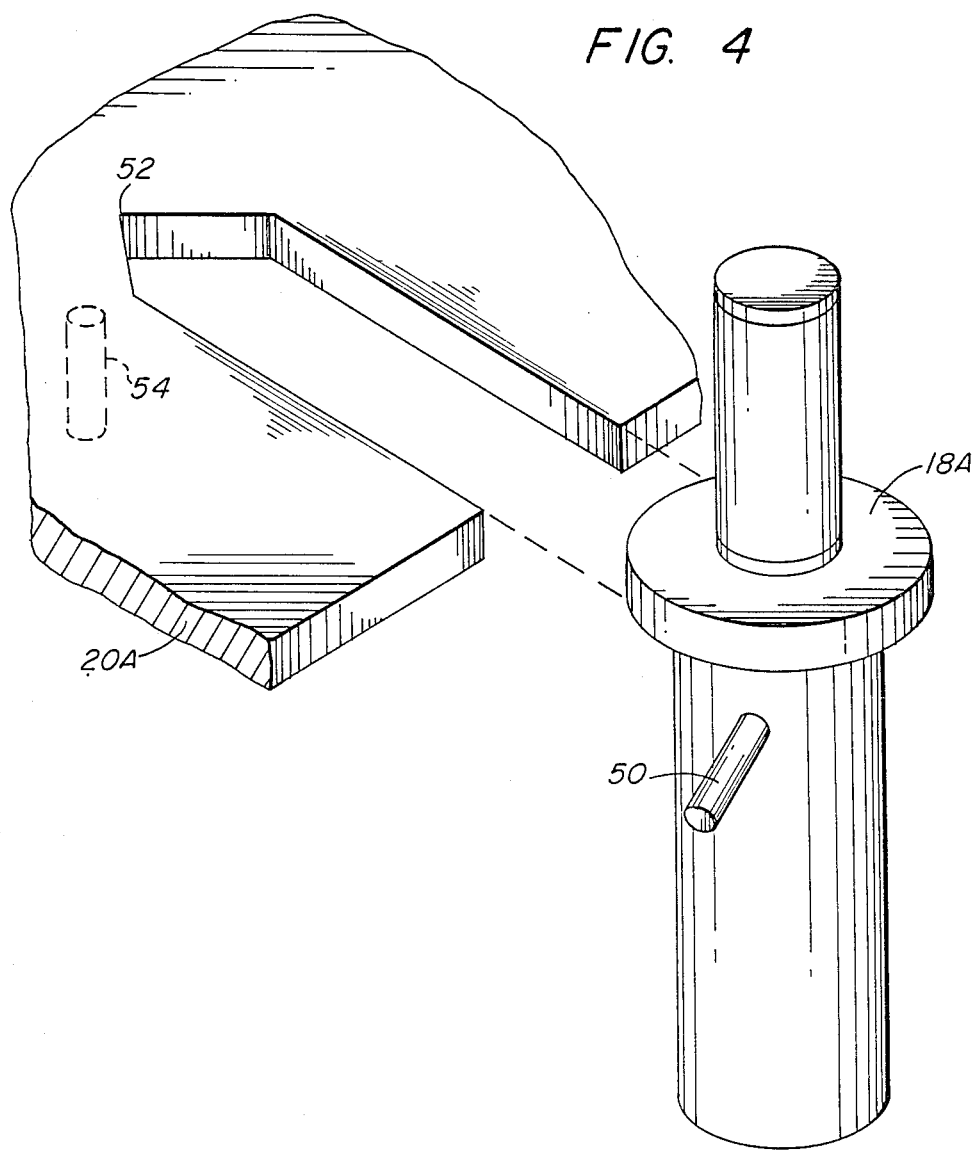
FIG. 4 is another isometric view of a typical ultrasonic tool assembly and machine tool table incorporating another embodiment of this invention.

Reference to FIG. 4 will illustrate another embodiment of this invention wherein the tool assembly as shown is essentially identical to the one described above, and therefore, need not be redescribed here. The only difference between the two tool assemblies is that the one shown in FIG. 4 has a rigid pin 50 extending horizontally from water shield 21 in a direction transverse to the direction in which it is inserted into the machine tool table 20A. In this embodiment, the end of the slot wherethrough the tool assembly is inserted is provided with a V-groove 52 at the end thereof, and a rigid pin 54 extending vertically downward adjacent to the slot on the side thereof where pin 50 will enter. Additionally, at least a portion of table 20A should be flat in the area of the V-groove to permit the flat bottom of fixturing plate 18A to set thereon for properly aligning the vertical axis. The pins 50 and 54 should extend for a sufficient length to permit pin 50 to engage pin 54 when the tool assembly is rotated. Accordingly, by assuring the proper positioning of V-groove 52 and pin 54, the tool assembly can be inserted and properly aligned very quickly.

To explain the operation of this embodiment, it should first be readily apparent that whenever the tool assembly is positioned all the way into the V-groove 52, the groove will serve to repeatedly position the tool assembly in the same exact position in the horizontal plane. The proper vertical positioning is then controlled by permitting fixturing plate 18A to rest on the surface of table 20A. Hence the proper positioning of the tool assembly in the three dimensions is very quickly assured merely by pushing the tool assembly all the way into the V-groove 52 and permitting fixturing plate 18A to rest on table 20A. The accurate rotational position is then assured by rotating the tool assembly clockwise, as shown in the drawing, until pin 50 contacts pin 54 and further rotation is blocked. Any means (not shown) can then be used to secure the tool assembly in that position.

What is claimed is:

1. In an ultrasonic machine tool having an ultrasonic tool assembly comprising a transducer having a booster affixed thereto with a sonotrode affixed to the booster, and an ultrasonic machine tool table to which the ultrasonic tool assemble is attachable, a structure for quickly and accurately aligning said ultrasonic tool assembly onto said ultrasonic machine tool table comprising: a fixturing plate attached to the tool assembly at a node point on said tool assembly; a slot through said table having a V-groove at the end thereof through which said tool assembly is inserted and serves to control the position of said tool assembly in the horizontal plane position, said table having a flat surface upon which said fixturing plate can rest to properly position said tool assembly vertically; a first engaging means protruding downward from said table and a second engaging means protruding laterally from said tool assembly below said fixturing plate which jointly serve to properly align the tool assembly radially when the two engaging means are in contact; and, means for securing said tool assembly in position.

2. A structure according to claim 1 in which said first and second engaging means comprise rigidly secured pins.

* * * * *